United States Patent
Narendran et al.

(10) Patent No.: US 8,195,159 B1
(45) Date of Patent: Jun. 5, 2012

(54) SESSION RESTORATION UPON RETURN TO EV-DO

(76) Inventors: Rajveen Narendran, Overland Park, KS (US); Andrew M. Wurtenberger, Olathe, KS (US); Sreekar Marupaduga, Overland Park, KS (US)

( * ) Notice: Subject to any disclaimer, the term of this patent is extended or adjusted under 35 U.S.C. 154(b) by 898 days.

(21) Appl. No.: 12/237,988

(22) Filed: Sep. 25, 2008

(51) Int. Cl.
   *H04W 4/00* (2009.01)

(52) U.S. Cl. ........ 455/435.1; 455/432.1; 455/432.2; 455/436; 455/443; 455/560; 370/329; 370/330; 370/331; 370/395.3; 709/217; 709/218; 709/227; 709/228; 709/229

(58) Field of Classification Search ........ 455/432.1, 455/432.2, 435.1, 436, 438, 439, 443, 553.1, 455/560; 370/329, 330, 331, 338, 395.3; 709/217, 218, 219, 227, 228, 229, 230, 231, 709/232
See application file for complete search history.

(56) References Cited

U.S. PATENT DOCUMENTS

| | | | |
|---|---|---|---|
| 6,169,900 B1 * | 1/2001 | Lahtinen | 455/439 |
| 6,944,462 B2 * | 9/2005 | Riihinen et al. | 455/453 |
| 7,146,636 B2 | 12/2006 | Crosbie | |
| 7,356,339 B2 * | 4/2008 | Nam | 455/436 |
| 7,428,415 B2 * | 9/2008 | Chang et al. | 455/435.1 |
| 7,457,265 B2 * | 11/2008 | Julka et al. | 370/331 |
| 2002/0196749 A1 * | 12/2002 | Eyuboglu et al. | 370/328 |
| 2003/0145091 A1 * | 7/2003 | Peng et al. | 709/229 |
| 2005/0091315 A1 * | 4/2005 | Hurtta | 709/204 |

* cited by examiner

*Primary Examiner* — Olumide T Ajibade Akonai

(57) ABSTRACT

Methods and systems are provided for session restoration upon return to EV-DO. In one embodiment, a first radio network controller (RNC) receives from an access terminal a session-establishment request, where the session-establishment request requests establishment of a session for the access terminal. The first RNC determines that the session-establishment request indicates that the access terminal does not currently have a session, and responsively queries a second RNC to determine whether the access terminal currently has a session with the second RNC, which the access terminal does. After querying the second RNC, the first RNC receives session data from the second RNC, where the session data corresponds to the session that the access terminal currently has with the second RNC. The first RNC uses the received session data to set up a session with the first RNC for the access terminal.

18 Claims, 3 Drawing Sheets

SESSION RESTORATION UPON RETURN TO EV-DO

BACKGROUND

1. Technical Field

The present disclosure relates to wireless communications, and, more particularly, to configuration of access nodes and access terminals in wireless communication systems.

2. Description of Related Art

Many people use mobile stations, such as cell phones and personal digital assistants, to communicate with cellular wireless networks, which typically provide communication services such as voice, Short Message Service (SMS) messaging, and packet-data communication. These mobile stations and networks typically communicate with each other over a radio frequency (RF) air interface according to a wireless communication protocol. In particular, mobile stations typically conduct wireless communications with one or more base transceiver stations (BTSs), each of which are arranged to send communications to and receive communications from mobile stations over the RF air interface.

Each BTS (sometimes referred to as a Node-B) is in turn communicatively connected with a network entity known as a base station controller (BSC) (sometimes referred to as a radio network controller (RNC)), which controls one or more BTSs and acts as a conduit between the one or more BTSs and one or more switches or gateways, such as a mobile switching center (MSC) and/or a packet data serving node (PDSN). The one or more switches or gateways may then interface with one or more signaling and/or transport networks. For example, an MSC may interface with the well-known public switched telephone network (PSTN). As another example, a PDSN may interface with one or more core packet data networks and/or the global Internet. As such, mobile stations can typically communicate over the one or more signaling and/or transport networks from anywhere inside the coverage area of one or more BTSs, via the BTS(s), a BSC, and a switch or gateway such as an MSC and/or PDSN.

SUMMARY

Methods and systems are provided for session restoration upon return to EV-DO. In one aspect, an embodiment may take the form of a method according to which a first RNC receives from an access terminal a session-establishment request, wherein the session-establishment request requests establishment of a session for the access terminal. The first RNC determines that the session-establishment request indicates that the access terminal does not currently have a session, and responsively queries a second RNC to determine whether the access terminal currently has a session with the second RNC, wherein the access terminal does currently have a session with the second RNC. After querying the second RNC, the first RNC receives session data from the second RNC, the session data corresponding to the session that the access terminal currently has with the second RNC. The first RNC uses the received session data to set up a session with the first RNC for the access terminal.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
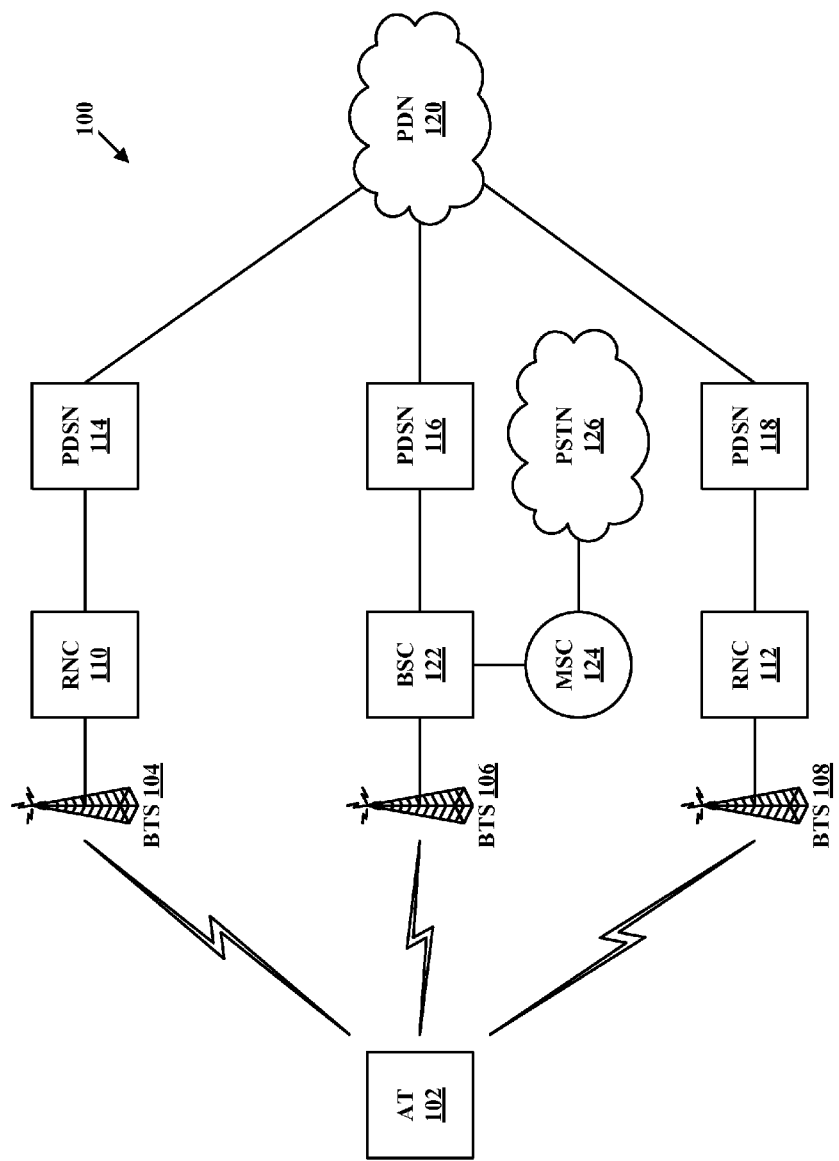
FIG. 1 is a simplified block diagram of a communication system, in accordance with exemplary embodiments.

As stated above, communications between a mobile station and one or more BTSs are typically conducted according to a wireless communication protocol. Some examples protocols are 1xRTT (Single Carrier Radio Transmission Technology) CDMA (Code Division Multiple Access), EV-DO (Evolution Data Optimized), WiMax (e.g. IEEE 802.16), WiFi (e.g. IEEE 802.11), GSM (Global System for Mobile Communications), etc. Furthermore, some mobile stations are capable of conducting wireless communications according to multiple different protocols. In one example, a mobile station may be able to communicate according to (a) 1xRTT CDMA, perhaps in conformance with one or more industry specifications such as IS-95 and IS-2000, as well as (b) EV-DO, perhaps in conformance with one or more industry specifications such as IS-856, Release 0 and IS-856, Revision A. In that case, a service provider may operate at least a CDMA network and an EV-DO network, with overlaying coverage areas. IS-95, IS-2000, IS-856, Release 0, and IS-856, Revision A are hereby incorporated herein by reference.

Regardless of the two (or more) types of networks with which the mobile station can communicate over the air, it may be the case that, each time the mobile station begins communicating with one of the networks, the mobile station has to undergo some sort of initial registration or session-setup process. In the case of a CDMA network, this may be a relatively quick registration process. In the case of a protocol such as EV-DO, this may be a relatively lengthy session-setup process, perhaps on the order of four or five seconds. Note that one or more different protocols may be involved, each perhaps having a characteristic communication-initiation time, such as a registration time or a session-setup time.

In EV-DO in particular, as mentioned, it typically takes four or five seconds for an access terminal to set up (i.e. negotiate) a session with an access node (which is EV-DO terminology for an RNC (and may also refer to a combination of an RNC and one or more BTSs)) with which the access terminal does not currently have a session. In general, in EV-DO, an access terminal that has a session with an access node can communicate via that access node with a PDSN and packet-data network to which the access node provides access, whereas an access terminal that does not have a session with an access node cannot communicate via that access node.

The process of an access terminal setting up a new session with an access node typically takes so long because so many steps are involved, such as (a) the access terminal requesting and receiving a UATI (Universal Access Terminal Identifier), (b) the access terminal requesting and receiving an air-interface connection (i.e. traffic channel), (c) the access node validating that the access terminal is authorized to engage in communication via the access node, (d) the access node setting up a radio-packet (e.g., A10/A11) connection between the access node and a PDSN for the access terminal, (e) the access terminal and the PDSN negotiating to establish a data link (e.g., a point-to-point protocol (PPP) connection), and (f)

an entity such as the PDSN or a Mobile-IP home agent assigning an IP address to the access terminal.

Setting up a new session may also involve (g) the access terminal and the access node negotiating a set of profile IDs, which are identifiers associated in EV-DO, Rev. A with types of packet-data communication (e.g. Voice over IP (VoIP), push-to-talk (PTT), best efforts, etc.), establishing the types of packet-data communication in which the access terminal can engage during the session and (h) the access terminal and the access node negotiating a set of personalities, which are essentially levels of QoS (Quality of Service) according to which the access terminal can engage during the session. And there may be other steps as well, and some mentioned herein may be left out, as this list is meant to be illustrative and not limiting.

Once session negotiation is complete, the access terminal has a session with the access node, and can therefore communicate over the packet-data network via the access node and the PDSN. Typically, the air-interface connection is then torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it sends another connection request to the access node, which then assigns a traffic channel to the access terminal. If, however, the access node receives data addressed to the access terminal, the access node typically sends a page to the access terminal over a paging channel, and assigns a traffic channel to the access terminal. The access terminal can then communicate over the packet-data network, using the traffic channel, IP address, radio-packet connection, and data link.

Thus, it can be appreciated that EV-DO session setup is a time-intensive and resource-intensive process. And it sometimes occurs that access terminals that are able to communicate according to both 1xRTT CDMA (referred to hereinafter simply as CDMA) and EV-DO will go through the session-setup process in EV-DO in a first subnet of the network (e.g. with a first RNC). The access terminal may then begin communicating according to EV-DO, and then experience a loss of EV-DO coverage, at which point the access terminal reverts to engaging in CDMA packet-data communication (i.e. with the CDMA network).

The access terminal may thereafter regain EV-DO coverage in a different subnet than before (i.e. with a second subnet of the network) (e.g. with a second RNC). In current implementations, access terminals that experience this sequence of events have to undergo the entire EV-DO session-setup process again, as if the prior EV-DO communication had never occurred. As stated, this can take four or five seconds, which is highly undesirable in general, and especially with respect to latency-sensitive types of communication such as PTT.

Note that it is known to transfer session information from a first RNC to a second RNC in cases where an access terminal is handed off directly from the first RNC to the second RNC. However, as described above, the situation where an access terminals proceeds from EV-DO communication with a first RNC, to CDMA communication with the CDMA network, and then back to EV-DO communication with a second RNC is currently often handled as if the session with first RNC never existed. That is, it is treated by the second RNC in substantially the same manner as an access terminal being powered on, communicating with the CDMA network, and then switching to EV-DO communication with the second RNC; and it is treated in substantially the same manner as an access terminal being powered on, and immediately beginning EV-DO communication with the second RNC.

In accordance with the present disclosure, upon receiving from an access terminal a request to establish a session, where that request indicates that the access terminal does not currently have a session, an EV-DO RNC will query some number of (i.e. one or more) neighboring RNCs to ascertain whether that access terminal currently has a session with any of them. If the answer is that it does, the RNC will receive information pertaining to the existing session (e.g. over an A13 interface) from the neighboring RNC, saving session-setup time.

As described, this approach may be most applicable, though not exclusively applicable, to the situation where an access terminal is communicating with the EV-DO network in one subnet, switches to the CDMA network upon losing EV-DO coverage, and then switches back to the EV-DO network in a different subnet. And subnets may be defined according to RNCs, but may also be defined as groups of RNCs, groups of IP addresses, sets of parameter configurations, and/or according to any other workable definition that may result in a situation where a given RNC is initially unaware that an access terminal currently has a session with another RNC.

Note that RNCs can parse session-setup requests from access terminals in order to ascertain whether or not those access terminals currently have a session with the RNC. In one embodiment, a first RNC may conclude that an access terminal does not currently have a session with the first RNC by detecting that a RATI (Random Access Terminal Identifier) is present in a request from the access terminal for a UATI. The first RNC may then use an identifier that identifies the access terminal as a unique physical device (i.e. a hardware ID) (e.g. an ESN (electronic serial number) or MEID (mobile equipment identifier)) to query one or more nearby RNCs (or subnets) for an existing session associated with that hardware ID. If such a session is found (e.g. on a second RNC), the second RNC on which it is found may transfer one or more session parameters associated with the found session to the first RNC, which will significantly speed up the process of enabling the access terminal to communicate via the first RNC.

And it should be noted that this overview is illustrative and not limiting. Additional and/or different features may be present in some embodiments. Furthermore, any description of an access terminal, access node, or other network element communicating or providing service according to EV-DO or CDMA is by way of example; any suitable wireless protocol(s) may be used instead, such as TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal 102; BTSs 104, 106, and 108; RNCs 110 and 112; PDSNs 114, 116, and 118; a packet-data network (PDN) 120; a BSC 122; an MSC 124; and a PSTN 126. Note that additional entities not depicted in FIG. 1 could be present as well. As an example, there could be more than one access terminal in communication with one or more of the BTSs 104-108; furthermore, there could be additional entities in communication with PDN 120. Also, there could be one or more devices and/or networks making up at least part of one or more of the communication links depicted in FIG. 1. As an example, there could be one or more routers, switches, or other devices or networks on the link between PDSN 114 and PDN 120.

Access terminal 102 may be any mobile device arranged to carry out the access-terminal functions described herein. As examples, access terminal 102 could be or include a cell phone, a personal digital assistant (PDA), a computer, a laptop, an air card, a hybrid IS-2000/IS-856 device, and/or a multi-mode Wi-Fi/cellular device. Access terminal 102 may include a user interface, a wireless-communication interface, a processor, and data storage comprising instructions executable by the processor for carrying out those access-terminal functions. The user interface may include buttons, a touchscreen, a microphone, and/or any other elements for receiving inputs, as well as a speaker, one or more displays, and/or any other elements for communicating outputs.

The wireless-communication interface may comprise an antenna and a chipset for communicating with BTSs over an air interface. Furthermore, the wireless-communication interface may comprise chipsets, other hardware, antennas, software, and/or firmware suitable for communicating according to multiple air-interface protocols. As an example, the wireless-communication interface may include both (a) a chipset suitable for EV-DO (Rel. 0 and/or Rev. A) communication and (b) a chipset suitable for CDMA communication. In some embodiments, a single chipset may be able to handle both types of communication. And many other possibilities exist as well, such as the interface being able to communicate according to more than two protocols, as well as the interface being able to communicate according to one or more different protocols in place of EV-DO and/or CDMA.

Each of BTS 104, 106, and 108 may be a conventional BTS as known in the art, arranged to carry out the BTS functions described herein, and may include a communication interface, a processor, and data storage comprising instructions executable by the processor to carry out those BTS functions. The communication interface may include one or more antennas, as well as one or more chipsets and perhaps other hardware for communicating over an air interface with access terminals. The communication interface may also include an interface (e.g. an Ethernet card) for communicating with an RNC or BSC. In general, each of the BTSs functions as a conduit for communications between access terminals and a device such as an RNC or BSC.

Each of RNC 110 and 112 may be a networking device or entity arranged to carry out the RNC functions described herein. As such, each RNC may include a communication interface, a processor, and data storage comprising instructions executable by the processor to carry out those RNC functions. The communication interface may include one or more interfaces (e.g. Ethernet cards) for communicating with one or more BTSs and one or more switches or gateways (e.g. a PDSN). In general, each RNC controls one or more BTSs and acts as a conduit for communication between the one or more BTSs and one or more switches or gateways.

Each of PDSN 114, 116, and 118 may be any networking server or other device arranged to carry out the PDSN functions described herein. As such, each PDSN may include a communication interface, a processor, and data storage comprising instructions executable by the processor for carrying out those PDSN functions. The communication interface may include one or more interfaces (e.g. Ethernet cards) for communicating with (a) one or more RNCs and/or one or more BSCs and (b) a packet-data network such as PDN 120. In general, each PDSN acts as a conduit for communications between (a) an RNC or a BSC and (b) PDN 120.

PDN 120 may include one or more wide area networks, one or more local area networks, one or more public networks such as the Internet, one or more private networks, one or more wired networks, one or more wireless networks, and/or one or more networks of any other variety. Devices in communication with PDN 120 may exchange data using a packet-switched protocol such as IP, and may be identified by an address such as an IP address.

BSC 122 may be a networking device or entity arranged to carry out the BSC functions described herein. As such, BSC 122 may include a communication interface, a processor, and data storage comprising instructions executable by the processor to carry out those BSC functions. The communication interface may include one or more interfaces (e.g. Ethernet cards) for communicating with one or more BTSs and one or more switches or gateways (e.g. an MSC and a PDSN). In general, each BSC controls one or more BTSs and acts as a conduit for communication between the one or more BTSs and one or more switches or gateways.

MSC 124 may be a networking device or entity arranged to carry out the MSC functions described herein. As such, MSC 124 may include a communication interface, a processor, and data storage comprising instructions executable by the processor to carry out those MSC functions. The communication interface may include one or more interfaces (e.g. Ethernet cards) for communicating with one or more BSCs and a circuit-switched telephone network (e.g. PSTN 126). In general, MSC 124 acts as a conduit for communication between the one or more BSCs PSTN 126, which may be the well-known public switched telephone network.

3. Exemplary Operation a. A First Exemplary Method

Figure 2:
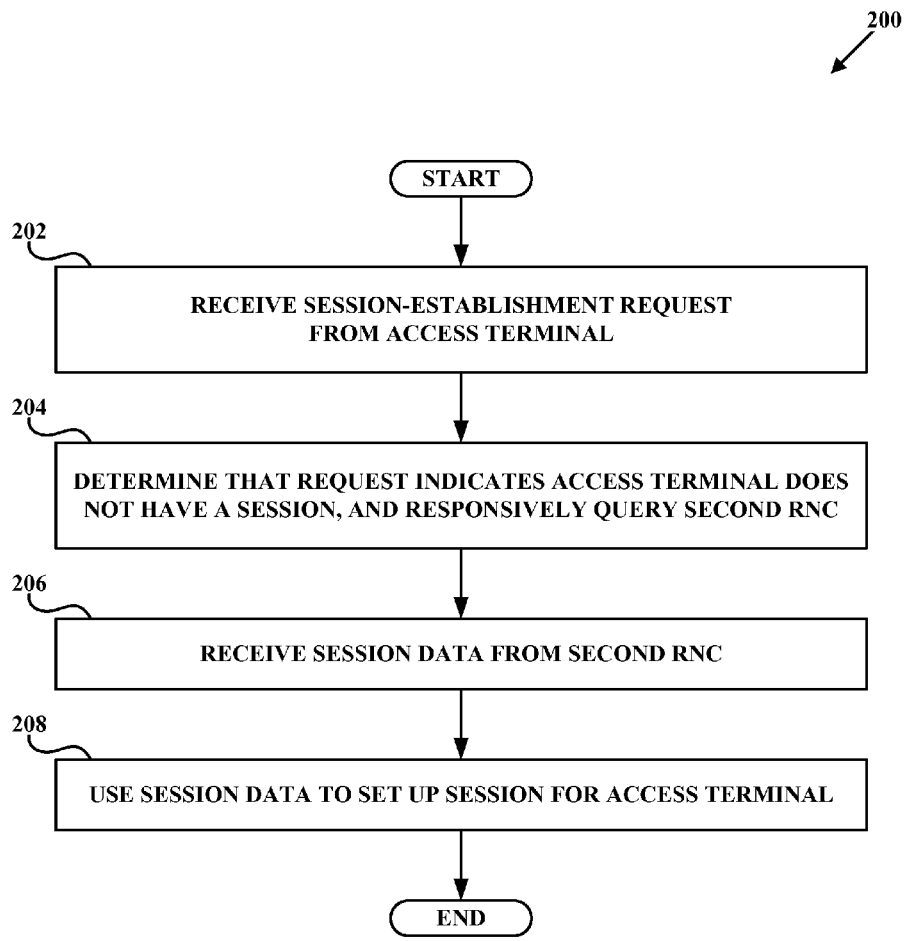
FIG. 2 is a flowchart of a method, in accordance with exemplary embodiments.

FIG. 2 depicts a flowchart of an exemplary method, in accordance with an exemplary embodiment. In some embodiments, as described below in connection with FIG. 2, method 200 may be carried out by an EV-DO RNC, such as RNC 112, which may operate in compliance with at least one of IS-856, Release 0 and IS-856, Revision A. In other embodiments, the method may be carried out by a combination of an RNC and a BTS; and in general, method 200 may be carried out by any network entity or any combination of network entities.

As shown in FIG. 2, method 200 begins at step 202, when RNC 112 receives (e.g. via BTS 108) from access terminal 102 a session-establishment request, requesting establishment of a session for access terminal 102. At step 204, RNC 112 determines that this request indicates that access terminal 102 does not currently have a session, and responsively queries RNC 110 to determine whether access terminal 102 currently has a session with RNC 110, which in this example it does. Note that RNC 112 and RNC 110 may be parts of different subnets of a wireless network.

Furthermore, RNC 112 determining that the session-establishment request indicates that access terminal 102 does not currently have a session may involve RNC 112 determining that the request comprises a random access terminal identifier (RATI). In other examples, this step may involve RNC 112 determining that the request comprises an access terminal identifier that is an element in a predefined set (e.g. numerical range or predefined list) of access terminal identifiers.

Also, RNC 112 may use an identifier for access terminal 102 to query RNC 110. In one example, RNC 112 may receive from access terminal 102 a hardware ID (e.g. an ESN or an MEID), and RNC 112 may send a query message to RNC 110, where that query message includes the identifier (e.g. hardware ID) for access terminal 102. Note that, in response to determining that the session-establishment request indicates that access terminal 120 does not currently have a session, RNC 112 may also query one or more other RNCs in addition to RNC 110, to determine whether access terminal 102 currently has a session with any of those one or more other RNCs. Whatever set of one or more RNCs is queried by RNC 112, that set may be selected based on those queried RNCs being neighboring RNCs with respect to RNC 112. This neighboring relationship may be determined according to location data, for example.

At step 206, after querying RNC 110, RNC 112 receives session data from RNC 110, where the received session data corresponds to the session that the access terminal currently has with RNC 110. Thus, RNC 110 may determine in response to receiving a query message from RNC 112 that RNC 110 is in fact currently maintaining a session for access terminal 102, and may responsively send (e.g. over an A13 interface) session data corresponding to that session to RNC 112. This session data may include one or more session parameters. At step 208, RNC 112 uses the received session data to set up a session for access terminal 102. RNC 112 may carry out step by storing one or more values from the received session data, and perhaps negotiating with access terminal 102 to confirm and/or modify one or more of these values.

Note that access terminal 102 may be capable of communicating according to both a first wireless protocol (e.g. EV-DO) and a second wireless protocol (e.g. CDMA). Furthermore, it may be the case that, prior to steps 202-208 being carried out, access terminal 102 and RNC 110 negotiated a session. Thereafter, access terminal 120 may have switched to communicating according to CDMA with BTS 106 and BSC 122, perhaps in response to losing connectivity with RNC 110. Thereafter, access terminal 102 may have detected the presence of RNC 112 via BTS 108, and responsively sent the session-establishment request of step 202 to RNC 112.

Without limitation, the present methods and systems could be utilized for any situation in which an access terminal begins communicating according to a first protocol, switches over to communicating according to a second protocol different from the first, and then reverts to communicating according to the first protocol. And the first and second protocols could be any two protocols mentioned herein, or any two other protocols. The first and second protocols could conform to any two standards selected from the group consisting of IS-2000, IS-856, IEEE 802.11, and 802.16. And either or both of the first and second protocols could conform to any other standard(s) as well.

b. A Second Exemplary Method

Figure 3:
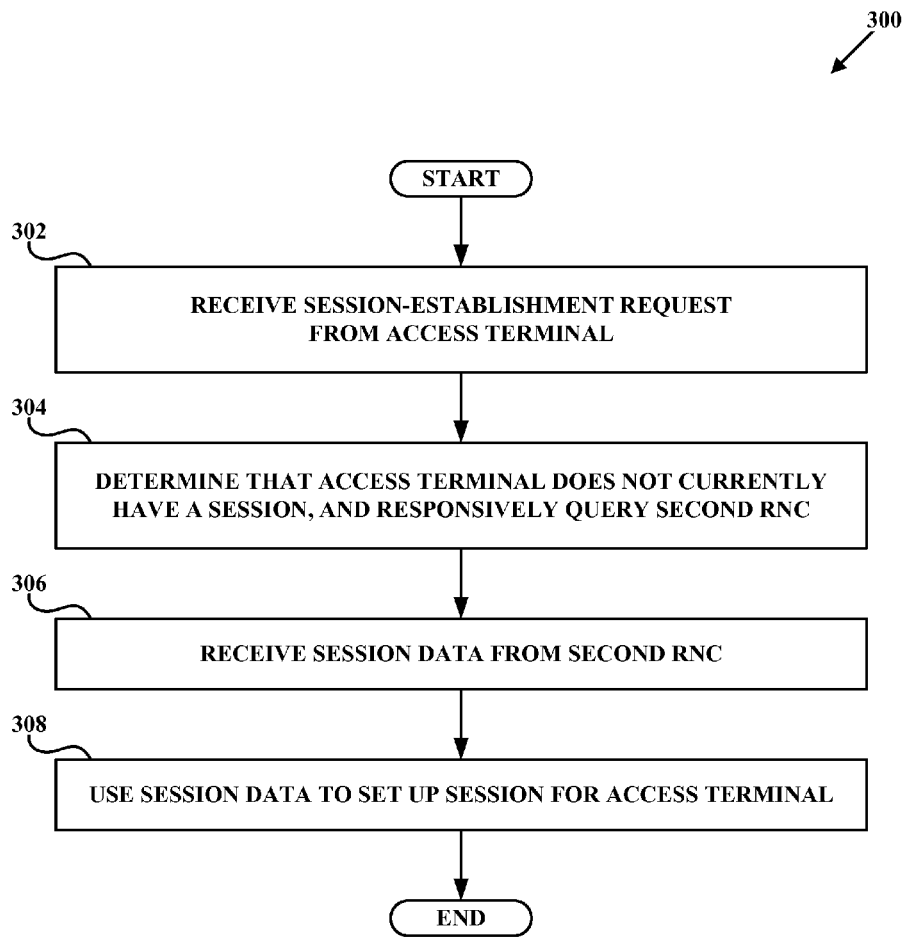
FIG. 3 is a flowchart of a method, in accordance with exemplary embodiments.

FIG. 3 is a flowchart of a second exemplary method, in accordance with an exemplary embodiment. In particular, FIG. 3 depicts a method 300, which may be carried out by an RNC such as RNC 112, perhaps in cooperation with one or more other entities. Method 300 is similar to method 200, and thus is not described in as great of detail. As shown in FIG. 3, method 300 begins at step 302, when RNC 112 receives from access terminal 102 a session-establishment request, requesting establishment of a session for access terminal 102. At step 304, RNC 112 determines that access terminal 102 does not currently have a session with RNC 112, and responsively queries RNC 110 to determine whether access terminal 102 currently has a session with RNC 110, which access terminal 102 does. At step 306, after querying RNC 110, RNC 112 receives session data from RNC 112, the session data corresponding to the session that access terminal 102 currently has with RNC 110. At step 308, RNC 112 uses the received session data to set up a session with RNC 112 for access terminal 102.

4. Conclusion

Various exemplary embodiments have been described above. Those skilled in the art will understand, however, that changes and modifications may be made to those examples without departing from the scope of the claims.

The invention claimed is:

1. A method comprising: a first radio network controller (RNC) receiving from an access terminal a session-establishment request, wherein the session-establishment request requests establishment of a session for the access terminal; the first RNC determining that the session-establishment request indicates that the access terminal does not currently have a session with the first RNC, and responsively querying each RNC in a set of two or more RNCs to determine whether the access terminal currently has a session with an RNC other than the first RNC, wherein the set includes a second RNC, wherein querying each RNC in the set comprises querying the second RNC to determine whether the access terminal currently has a session with the second RNC, wherein the access terminal does currently have a session with the second RNC;

after querying the second RNC, the first RNC receiving session data from the second RNC, the session data corresponding to the session that the access terminal currently has with the second RNC; and the first RNC using the received session data to set up a session with the first RNC for the access terminal.

2. The method of claim 1, wherein at least one of the access terminal, the first RNC, and the second RNC operates in compliance with at least one of IS-856, Release 0 and IS-856, Revision A.

3. The method of claim 1, wherein the access terminal comprises at least one of a cellular telephone, a personal digital assistant, a computer, a laptop computer, a laptop air card, and a hybrid access terminal.

4. The method of claim 1, wherein determining that the session-establishment request indicates that the access terminal does not currently have a session with the first RNC comprises determining that the session-establishment request comprises a random access terminal identifier.

5. The method of claim 1, wherein determining that the session-establishment request indicates that the access terminal does not currently have a session with the first RNC comprises determining that the session-establishment request comprises an access terminal identifier that is an element in a predefined set of access terminal identifiers.

6. The method of claim 1, wherein querying the second RNC to determine whether the access terminal currently has a session with the second RNC comprises querying the second RNC with an identifier for the access terminal.

7. The method of claim 6, wherein the identifier for the access terminal is a hardware ID, the method further comprising the first RNC receiving the hardware ID from the access terminal.

8. The method of claim 7, wherein the hardware ID is at least one of an electronic serial number and a mobile equipment identifier.

9. The method of claim 1, wherein receiving the session data from the second RNC comprises receiving the session data from the second RNC over an A13 interface.

10. The method of claim 1, wherein the first RNC is part of a first subnet of a wireless network, and wherein the second RNC is part of a second subnet of the wireless network, wherein the first subnet is different than the second subnet.

11. The method of claim 1, wherein the access terminal is capable of communicating according to both a first wireless protocol and a second wireless protocol, wherein the first RNC and the second RNC both operate according to the first protocol, the method further comprising:
the access terminal and the second RNC negotiating the session that the access terminal has with the second RNC; and
after negotiating the session that the access terminal has with the second RNC, the access terminal switching to communicating according to the second protocol with a base station; and
after switching to communicating according to the second protocol with the base station, the access terminal sending the session-establishment request to the first RNC.

12. The method of claim 1, further comprising the first RNC selecting the RNCs in the set of two or more RNCs for querying based on those RNCs being neighboring RNCs of the first RNC.

13. The method of claim 1, further comprising the first RNC selecting the second RNC for querying based on the second RNC being a neighboring RNC of the first RNC.

14. The method of claim 1, wherein the session data comprises at least one session parameter.

15. A first radio network controller (RNC) comprising: a wireless-communication interface; a processor; and data storage comprising instructions executable by the processor for carrying out functions including: receiving from an access terminal a session-establishment request, wherein the session-establishment request requests establishment of a session for the access terminal; determining that the session-establishment request indicates that the access terminal does not currently have a session with the first RNC, and responsively querying each RNC in a set of two or more RNCs to determine whether the access terminal currently has a session with an RNC other than the first RNC, wherein the set includes a second RNC, wherein querying each RNC in the set comprises querying the second RNC to determine whether the access terminal currently has a session with the second RNC,
wherein the access terminal does currently have a session with the second RNC;
after querying the second RNC, receiving session data from the second RNC, the session data corresponding to the session that the access terminal currently has with the second RNC; and using the received session data to set up a session with the first RNC for the access terminal.

16. The first RNC of claim 15, wherein at least one of the access terminal, the first RNC, and the second RNC operates in compliance with at least one of IS-856, Release 0 and IS-856, Revision A.

17. The first RNC of claim 15, wherein the first RNC is part of a first subnet of a wireless network, and wherein the second RNC is part of a second subnet of the wireless network, wherein the first subnet is different than the second subnet.

18. A method comprising: a first radio network controller (RNC) receiving from an access terminal a session-establishment request, wherein the session-establishment request requests establishment of a session for the access terminal;
the first RNC determining that the access terminal does not currently have a session with the first RNC, and responsively querying each RNC in a set of two or more RNCs to determine whether the access terminal currently has a session with an RNC other than the first RNC, wherein the set includes a second RNC, wherein querying each RNC in the set comprises querying the second RNC to determine whether the access terminal currently has a session with the second RNC, wherein the access terminal does currently have a session with the second RNC;
after querying the second RNC, the first RNC receiving session data from the second RNC, the session data corresponding to the session that the access terminal currently has with the second RNC; and the first RNC using the received session data to set up a session with the first RNC for the access terminal.

\* \* \* \* \*

UNITED STATES PATENT AND TRADEMARK OFFICE
CERTIFICATE OF CORRECTION

PATENT NO. : 8,195,159 B1  
APPLICATION NO. : 12/237988  
DATED : June 5, 2012  
INVENTOR(S) : Rajveen Narendran, Andrew M. Wurtenberger and Sreekar Marupaduga Page 1 of 1

It is certified that error appears in the above-identified patent and that said Letters Patent is hereby corrected as shown below:

On the title page, item (73), please add the Assignee -- Sprint Spectrum L.P. --.

Signed and Sealed this  
Fifth Day of February, 2013

Teresa Stanek Rea  
*Acting Director of the United States Patent and Trademark Office*